(12) United States Patent
Persson

(10) Patent No.: US 6,528,730 B2
(45) Date of Patent: Mar. 4, 2003

(54) THREE-CORE CABLE

(76) Inventor: Karl-Gustav Persson, 33292 Gislaved, Ebbebo (SE)

( * ) Notice: Subject to any disclaimer, the term of this patent is extended or adjusted under 35 U.S.C. 154(b) by 0 days.

(21) Appl. No.: 10/014,360

(22) Filed: Dec. 14, 2001

(65) Prior Publication Data

US 2002/0084099 A1 Jul. 4, 2002

(30) Foreign Application Priority Data

Dec. 14, 2000 (SE) .............................................. 0004632

(51) Int. Cl.⁷ .............................................. H01B 13/32
(52) U.S. Cl. ........................................................ 174/116
(58) Field of Search ................................ 174/116, 108, 174/23 R; 385/107

(56) References Cited

U.S. PATENT DOCUMENTS

| | | | | | |
|---|---|---|---|---|---|
| 1,746,390 A | * | 2/1930 | Frederickson | ............... | 174/116 |
| 2,012,126 A | * | 8/1935 | Gilbert | ...................... | 174/108 |
| 2,286,826 A | * | 6/1942 | Morrison | ..................... | 174/115 |
| 3,288,916 A | * | 11/1966 | Koon | ..................... | 174/110 F |
| 4,326,094 A | * | 4/1982 | Hunn | ......................... | 174/116 |
| 4,870,226 A | * | 9/1989 | Kreuger et al. | ......... | 174/102 R |
| 5,133,034 A | * | 7/1992 | Arroyo et al. | ............ | 174/23 C |

* cited by examiner

Primary Examiner—Chau N. Nguyen
(74) Attorney, Agent, or Firm—Sughrue Mion, PLLC

(57) ABSTRACT

A three-core cable, preferably intended for medium-level voltage, is provided with a longitudinal water seal. Three conductors 12' are included inside the sheath and screen, and filler strings (18") are placed in cavities in the longitudinal direction of the cable at the outside of the conductors (12') in order to impart to the cable its intended shape. The longitudinal water seal is achieved with the aid of expansion tape (28'). The three-core cable is particularly characterized in that the expansion tape (28') is not only wound on all conductors (12') but also on all filler strings (18"), without covering them fully, and in that the winding is carried out in such a manner that the expansion tape (28') on one conductor (12') makes contact both with the expansion tape (28') on adjacent conductors (12') and with the expansion tape (28') on adjacent filler strings (18") within a given length of cable.

8 Claims, 2 Drawing Sheets

THREE-CORE CABLE

The present invention concerns a three-core cable, preferably intended for medium-level voltage, provided with a longitudinal water seal, which cable also comprises, in association with the three conductors that are included inside the sheath and screen, filler strings that are placed in cavities in the longitudinal direction of the cable at the outside of the conductors in order to impart to the cable its intended shape, whereby a longitudinal water seal is achieved with the aid of expansion tape.

BACKGROUND OF THE INVENTION

One reason that a three-core cable is provided with a longitudinal water seal is a desire to prevent water from travelling long distances within the three-core cable following damage having occurred with respect to the outer sheath of the cable. The aim of this is to prevent as far as is possible the three insulated conductors of the cable being exposed to water or moisture. It is namely previously known that moisture in the PEX insulation of a cable can cause what is known as "water treeing", that is, weakening of the insulating capacity of the material used. It has been necessary to exchange many older cable throughout the years due to this phenomenon. It should however be noted that, while it is true that the PEX cables used earlier were constructed in a different manner to today's cables, it is possible to produce under extreme conditions in the laboratory the said water treeing in cables that are currently used.

One of the differences between the old design and the current design concerns the outer semi-conducting layer that surrounds each conductor. Nowadays, this layer is extruded with semi-conducting rubber or semi-conducting PEX. The layer previously was varnished using a semi-conducting water emulsion, after which semi-conducting textile tape was applied over the layer. Semi-conducting tape was occasionally used on its own. Experience from the field with the current design is very good, but there is a certain amount of concern among customers that the problem of treeing will again arise.

Several suggestions have been made for the design of a three-core cable with a longitudinal water seal according to what is described in the introduction.

Accordingly, some of these prior art solutions are shown in FIGS. 1–3, which are primarily intended to illuminate the fact that a considerable amount of sealant material in the form of expansion tape is currently used in association with known three-core cables provided with a longitudinal water seal.

The three-core cables 10 according to FIGS. 1 and 2 are sealed in the longitudinal direction in essentially the same way and also have essentially the same design. The cables 10 thus comprise three identical conductors 12, each of which consists of an inner core 14, which is surrounded by the normal insulation 16. In order for the three-core cable 10 to obtain an essentially round shape, it is supplemented with three identical filler strings 18, 18'. According to FIG. 1, these filler strings are essentially round, while in FIG. 2 they are shaped in order to further improve the desired round shape of the three-core cable 10 and to reduce cavities. Outside of the package that is thus formed of conductors 12 and filler strings 18, 18', a cable screen 20 of metal threads 22 is located, and the outer cable sheath 24 is located outside of the cable screen 20.

In the event of damage occurring with respect to the cable sheath 24, water or moisture can penetrate the cable 10, which, if the cable 10 were not provided with a longitudinal water seal, would entail the water spreading along long stretches of the cable 10. Cavities 26 that exist in the three-core cable 10 must therefore be sealed in the longitudinal direction in order to limit the spread of the water to as short a stretch as possible, in the best case to a few meters only.

In order to achieve the longitudinal water seal according to the known designs in FIGS. 1 and 2, each conductor 12 is now fully covered with surrounding expansion tape 28. The cable body itself is also externally provided with fully covering expansion tape 28, and, in addition, a further layer of expansion tape 28 may, in order to further increase the security, be placed outside of the cable screen 20.

Furthermore, expansion thread 30 is placed along the longitudinal direction of the cable in association with the cavities 26 that exist, in order to further improve the known designs.

The expansion tape 28 normally consists of a sealant in the form of polyacrylate, which is applied to a woven tape (not shown in the drawing). All tapes except for the one that is applied outside of the cable screen 20 must be of semi-conducting material in order to ensure electrical contact between the screen and the outer semiconductor. This material requirement entails, naturally, additional cost. It would be significantly cheaper if it were possible to use expansion tape 28 of non semi-conducting material.

In the arrangement according to FIG. 3, the expansion tape 28 is not wound around the conductors 12, as it is in the designs according to FIGS. 1 and 2, but is placed around these in the longitudinal direction. One advantage of this is that the operation concerning the winding of the expansion tape onto each conductor 12 is eliminated, but even in this case, semi-conducting expansion tape is required.

As is clear from the above description of the prior art solutions, all of these suggestions have the common property that they require very large consumption of material both with respect to the expansion tape that is used for the longitudinal water seal and with respect to the filler strings that are placed in direct connection with the three conductors. All of the currently known embodiments concerning three-core cables with a longitudinal water seal are thus, due to the large material consumption, very expensive to manufacture, and thus there is an accumulated need for a cable that can be manufactured more cheaply. This means that it requires less material consumption and is easier to manufacture than current cables of an equivalent type.

SUMMARY OF THE INVENTION

The aim of the present invention is primarily to make possible a considerable reduction of the amount of expansion tape that is used during manufacture of three-core cables.

Another aim is to make possible the use of a cheaper expansion tape material.

According to the invention, this is made possible with a three-core cable, preferably intended for medium-level voltage, provided with a longitudinal water seal, said cable comprising, in association with the three conductors (12) that are included inside the sheath and screen, filler strings (18") that are placed in cavities in the longitudinal direction of the cable at the outside of the conductors in order to impart to the cable its intended shape, whereby the longitudinal water seal is achieved with the aid of expansion tape (28'), characterized in that the expansion tape is wound on all conductors and on all filler strings without covering them fully, and in that the winding is carried out in such a manner that the expansion tape on one conductor makes contact both with the expansion tape on adjacent conductors and with the expansion tape on adjacent filler strings within a given length of cable.

This allows to use cheaper expansion tape as it is not necessary anymore to have it semi-conducting, while keeping the water sealing function.

According to a preferred embodiment, the direction of winding of the expansion tape on the conductors is opposite to the direction of winding on the filler strings. This is one of the possible solutions for ensuring contact between expansion tapes on the conductors and on the filler strings.

According to another embodiment of the present invention, the pitches with respect to the winding of the expansion tape are different on the three conductors. This is another solution for ensuring contact between expansion tapes on the conductors.

In such a case, the pitches with respect to the winding of the expansion tape are different on the filler strings.

According to still another embodiment, the pitches of the winding of the expansion tape have the same basic value but vary randomly within predetermined limits.

The expansion tape may be made of non semi-conducting material.

The expansion tape may be made of two woven layers with a layer of expansion powder between them.

At last, the filler strings that have been wound with expansion tape comprise filler tubes that have obtained the intended shape on cabling. This allows to have a better round shape of the cable once finished.

The invention will now be described in more detail with reference to the attached drawings, which also show, as described above, the principles of known constructions of three-core cables with a longitudinal water seal as comparison with the principles of the new design of a three-core cable of the invention.

BRIEF DESCRIPTION OF THE DRAWINGS

Functionally identical or equivalent parts of the various drawings are provided with the same reference figures, in order to facilitate a direct comparison between the different constructions.

In the figures.

DETAILED DESCRIPTION OF THE INVENTION

Figure 1:
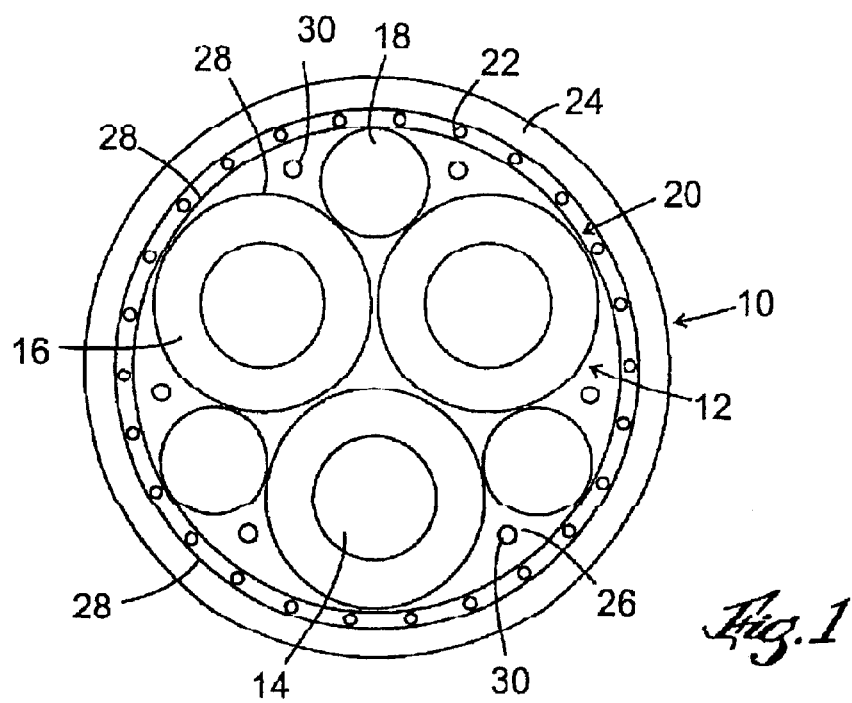
FIG. 1 shows in cross-section a three-core cable, as presently known, that is provided with a longitudinal water seal.
Figure 2:
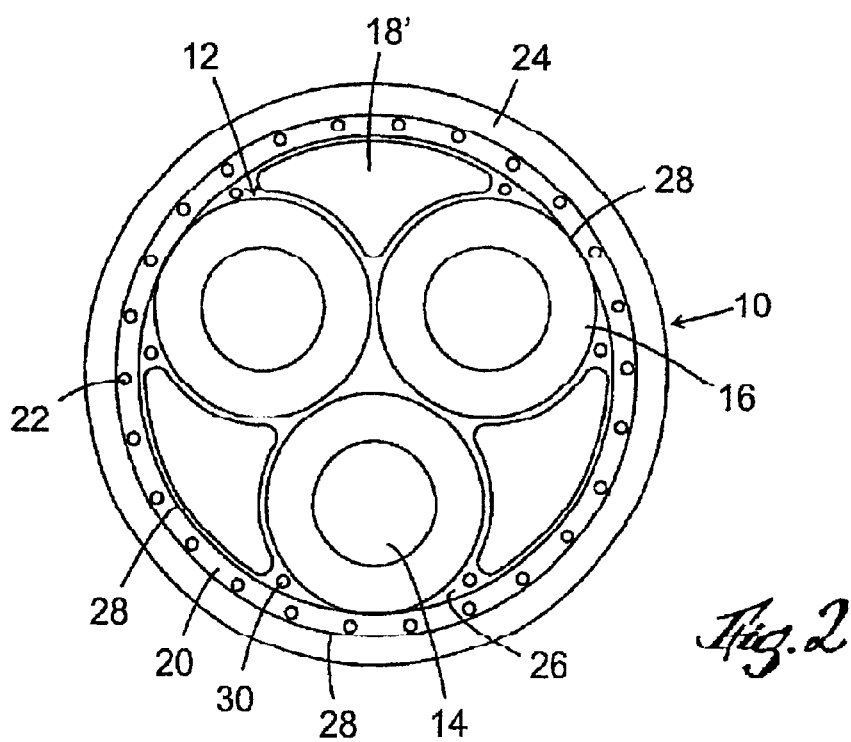
FIG. 2 shows in cross-section another embodiment of a known three-core cable, which is provided with a longitudinal water seal of the same type as the design according to FIG. 1.
Figure 3:
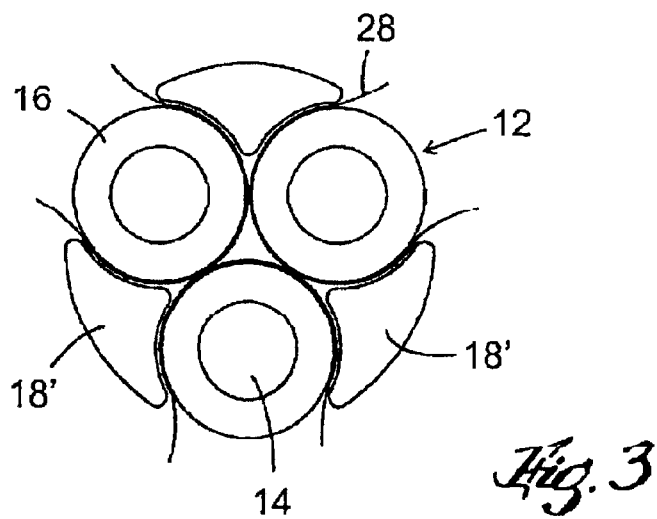
FIG. 3 shows in cross-section essential parts of a three-core cable, again as presently known, with a longitudinal water seal, whereby the seal arrangement is designed in a different manner than in the cables according to FIGS. 1 and 2.
Figure 4:
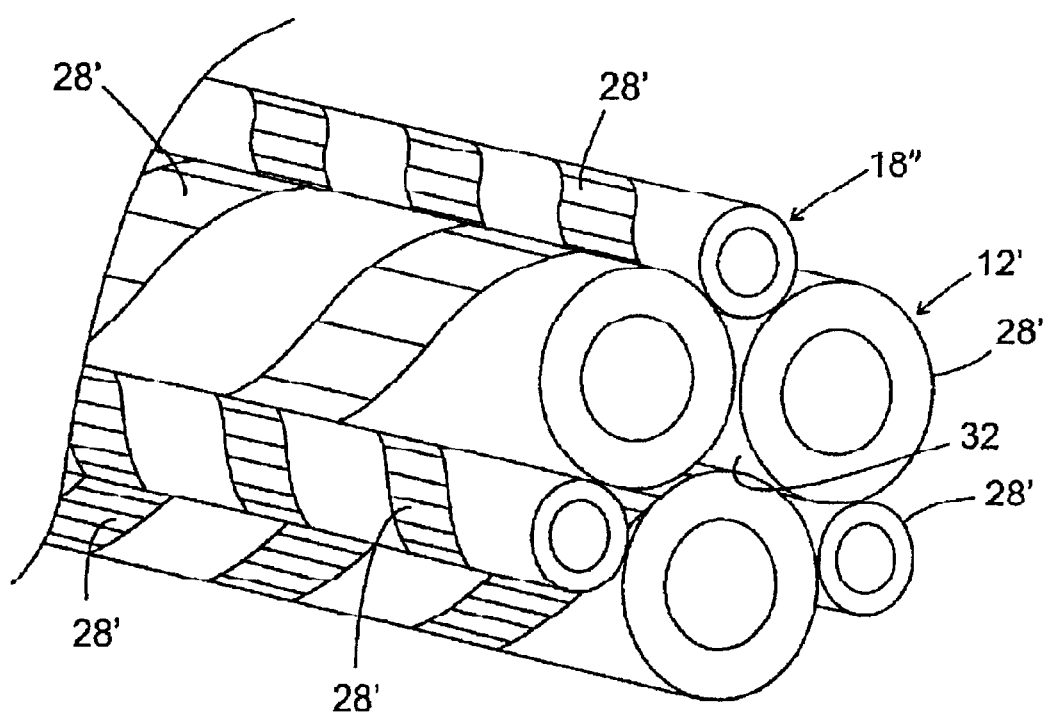
FIG. 4 shows in perspective view a cross-section through the part existing within the cable screen of a stretch of three-core cable with a longitudinal water seal, which cable constitutes an advantageous embodiment of a design that is designed according to the principles of the invention.

FIG. 4 shows an embodiment of the invention with its design with respect to a longitudinal water seal in association with conductors 12' and filler strings 18". Relatively thin expansion tape 28' is thus wound around both the conductors 12' and the filler strings 18" without, however, covering them fully. The arrangement is to be such that expansion tape 28' on one conductor 12' always makes contact both with expansion tape 28' on adjacent conductors 12' and with expansion tape 28' on adjacent filler strings 18" within a given stretch of cable. This is possible, according to FIG. 4, by arranging the winding direction of the expansion tape 28' on the conductors 12' to be opposite the winding direction on the filler strings 18". This is achieved in such a manner that the expansion tape 28' on one conductor 12' makes contact both with the expansion tape 28' on adjacent conductors 12' and with the expansion tape 28' on neighboring filler strings 18" within a stretch of cable.

It has proved to be possible with the new design according to the invention to use expansion tape 28' of cheap non semi-conducting material, which has a degree of coverage that does not need to reach more than approximately 15% either on conductors 12' or on filler strings 18". The required water seal in the longitudinal direction of the three-core cable can be achieved, despite the degree of coverage being held at such a low level. The sealing function is thus based on expansion tape 28' on one conductor 12' coming into contact with expansion tape 28' on another conductor 12' or with expansion tape 28' on filler strings 18" as often and as efficiently as possible.

The higher the degree of coverage, naturally, the more often these contacts will occur, but the cost also increases. In order to achieve as frequent a contact as possible between the six involved parts provided with expansion tape that does not fully cover them—the conductors 12' and the filler strings 18"—the direction of winding of the expansion tape on the conductors 12' is, according to FIG. 4, opposite to the direction of winding on the filler strings 18". Contact between expansion tape 28' on a filler string 18" and expansion tape 28' on a conductor 12' is thus achieved at the center of a cross, something that is advantageous.

The contact between expansion tape 28' on two conductors 12', however, is not achieved in association with a cross, and it can, in principle and with a bit of bad luck, be totally absent, if the pitches of the expansion tape 28' on these two conductors 12' are the same. Thus it is appropriate in order to avoid this possibility that the expansion tape 28' on the three conductors 12' is wound at different pitches. This can be achieved, for example, by phase one always having a pitch of 100 mm, phase two having a pitch of 110 mm, and phase three having a pitch of 120 mm. Another method is to use always a basic pitch of 110 mm on all three phases, while allowing the pitch to vary randomly within, for example, ±110 mm.

When the three conductors 12' and the filler strings 18" have been provided with expansion tape 28' of non semi-conducting material according to the description given above, the entire cable package is provided (outside of the arrangement shown in FIG. 4) with further expansion tape (not shown). A low degree of coverage is used also in this case. The pitch is laid down in a single direction. The cable screen (not shown) then follows outside of this tape and after this a further expansion tape (not shown) that has a low degree of coverage but now has a pitch in the opposite direction relative to the expansion tape that lies most closely under it.

The expansion tape 28' used in association with the invention preferably comprises two layers of a polyester weave, whereby the expansion powder used is glued between the said layers. Other types of expansion tapes are, of course, also possible, for example, a type of tape in which the powder lies glued onto a single plastic foil.

A longitudinal central hole 32 between the three conductors 12' is also present in the cable body. When the conductors 12' have small dimensions, this central hole 32 will be sealed, but this will become more and more difficult to achieve for larger dimensions. Three different methods are available to achieve sealing. It is possible to use an expansion thread. This method, however, is relatively expensive. It is also possible to seal using a filler string of, for example, PE. However, this method also entails a high cost.

Sealing can advantageously be achieved using one or two narrow strips of expansion tape that lie longitudinally placed and are inserted in association with the cabling itself. This constitutes the cheapest method.

It is also advantageous that the filler strings 18" are designed as thin-walled tubes. This ensures that they acquire a shape in a natural manner, such that the cable becomes essentially round on applying the outer sheath, whereby also reduced cavity space is achieved. Furthermore, it is relatively simple to wind the expansion tape 28' onto the thin tube-shaped filler tubes 18" before the change of shape. This is, of course, much more difficult when using a pre-formed filler profile.

Modifications of the three-core cable described above having a longitudinal water seal can, naturally, be achieved within the framework of the accompanying claims.

What is claimed is:

1. A three-core cable, capable of medium-level voltage, and provided with a longitudinal water seal, said cable comprising:

three conductors inside a sheath and a screen, filler strings in cavities defined by the three conductors and the screen in a longitudinal direction of the cable for imparting an intended shape to the cable, and expansion tape wound on the three conductors and on the filler strings without covering them fully, wherein the expansion tape is wound on one of the three conductors to make contact both with the expansion tape on adjacent conductors and with the expansion tape on adjacent filler strings within a given length of cable.

2. Cable according to claim 1, characterized in that the direction of winding of the expansion tape on the conductors is opposite to the direction of winding on the filler strings.

3. Cable according to claim 1, characterized in that the pitches with respect to the winding of the expansion tape are different on the three conductors.

4. Cable according to claim 3, characterized in that the pitches with respect to the winding of the expansion tape are different on the filler strings.

5. Cable according to claim 1, characterized in that the pitches of the winding of the expansion tape have the same basic value but vary randomly within predetermined limits.

6. Cable according to claim 1, characterized in that the expansion tape is made of non semi-conducting material.

7. Cable according to claim 1, characterized in that the expansion tape is made of two woven layers with a layer of expansion powder between them.

8. Cable according to claim 1, characterized in that the filler strings that have been wound with expansion tape comprise filler tubes that have obtained the intended shape on cabling.

* * * * *